United States Patent
Trueck

[19]

[11] Patent Number: 5,922,391
[45] Date of Patent: Jul. 13, 1999

[54] COMPOSITION LIKE MAYONNAISE BUT HAVING LESS OR NO EDIBLE OIL

[75] Inventor: Hans Uwe Trueck, Stuttgart, Germany

[73] Assignee: Nestec S.A., Vevey, Switzerland

[21] Appl. No.: 08/728,244

[22] Filed: Oct. 8, 1996

[30] Foreign Application Priority Data

Oct. 13, 1995 [EP] European Pat. Off. ............... 95202774

[51] Int. Cl.$^6$ ....................................................... A23C 9/13
[52] U.S. Cl. ........................... 426/605; 426/575; 426/578; 426/613
[58] Field of Search .................................... 426/605, 613, 426/575, 578

[56] References Cited

U.S. PATENT DOCUMENTS

| | | | |
|---|---|---|---|
| 3,764,347 | 10/1973 | Katz | 426/605 |
| 4,037,001 | 7/1977 | Flowers | 426/605 |
| 4,226,895 | 10/1980 | Miller | 426/604 |
| 4,308,294 | 12/1981 | Rispoli | 426/578 |
| 4,562,086 | 12/1985 | Smolka | 426/578 |
| 5,137,742 | 8/1992 | Bakal | 426/613 |
| 5,279,844 | 1/1994 | Wesdorp | 426/578 |
| 5,309,639 | 5/1994 | Fung | |
| 5,338,560 | 8/1994 | Wesdorp | 426/578 |
| 5,362,510 | 11/1994 | Mizoguchi | 426/578 |
| 5,512,311 | 4/1996 | Capitani | 426/578 |
| 5,538,751 | 7/1996 | Carter | 426/513 |
| 5,643,627 | 7/1997 | Huang | 426/578 |

FOREIGN PATENT DOCUMENTS

| | | |
|---|---|---|
| 0049927 | 4/1982 | European Pat. Off. . |
| 0588113A1 | 5/1993 | European Pat. Off. . |
| 2623376 | 11/1987 | France . |
| 1924465 | 11/1970 | Germany . |
| 2145979 | 3/1973 | Germany . |
| 61-209562 | 9/1986 | Japan . |
| 2187075 | 9/1987 | United Kingdom .................. 426/605 |
| WO9315617 | 8/1993 | WIPO . |

OTHER PUBLICATIONS

Rombauer et al 1964 Joy of Cooking Times Mirror The New American Library New York p. 351.

Nidetch 1984 Weight Watchers New American Library New York p.

Boxer 1974 Natures's Harvest Henry Regnery Co., Chicago p. 145.

*Primary Examiner*—Carolyn Paden
*Attorney, Agent, or Firm*—Vogt &O'Donnell, LLP

[57] ABSTRACT

A composition which has a texture like mayonnaise but which has less or no edible oil is prepared with water and vinegar and less than 20% oil and by weight, yoghurt in an amount of from about 5% to 50% and carrageenan in an amount of from 0.03% to 1%. The composition also may include a starch, particularly, a hydroxypropyl or acetylated starch, and further, particularly when starch is present, the composition also may include a non-gelling hydrocolloid such as xanthan.

12 Claims, No Drawings

COMPOSITION LIKE MAYONNAISE BUT HAVING LESS OR NO EDIBLE OIL

BACKGROUND OF THE INVENTION

The present invention relates to compositions which are like mayonnaise but which contain less edible oil.

Mayonnaise is known in the art as being a thick emulsified food dressing prepared from edible oil, water, egg yolk and vinegar. For being designated as a mayonnaise according to existing legislation, a product must contain at least 60% oil. Although, nowadays the tendency in the market, taking in account the desires of the consumer, is to reduce the oil content and to have the above mentioned emulsified products with an oil content of less than 60%. However, these products can no longer receive the name of mayonnaise and are therefore designated as "mayonnaise-like" products.

The existing literature already mentions mayonnaise-like products. The German patent DE 1924465 concerns a mayonnaise-like product containing from 15 to 35% of oil, from 6 to 10% of egg yolk, from 5 to 10% of low fat curd, and other minor components as sugar, salt and vinegar. The problem with such a composition is the presence of egg yolk, which gives a composition which is not cholesterol-free and is not heat stable. The German patent DE 2145979 concerns a mayonnaise-like product containing 30% or more oil, and between 20 and 80% of curd or yoghurt.

For having a mayonnaise-like product, it is necessary to have a certain viscosity and texture (fat-equivalent mouth feeling), and the presence of quark or yoghurt does not bring a sufficient viscosity and texture, but this is reached taking into account a high level of oil. Another solution for reaching the high viscosity and the texture is given in European Patent Application Publication No. 0 049 927, wherein a high content of yoghurt and a combination of different hydrocolloids is used. The disadvantage is that the product is not as smooth as required for mayonnaise, and the controlled gelation, which is necessary to reach a garnishable product, is not achievable. Additionally, French Patent Application Publication No. 2 623 376 concerns a mayonnaise-like product containing from 15 to 60% of yoghurt, cream, white cheese and egg yolk. The presence of egg yolk is not desired for the reasons given above and furthermore, cream and white cheese increase not only the viscosity but also the oil content. Finally, all of the patents and applications referred to above mention the possibility of adding yoghurt or quark, the reason for this addition being to give to the final product an opacity similar to that of a mayonnaise.

SUMMARY OF THE INVENTION

The aim of the present invention is to eliminate the above-mentioned drawbacks and to have a heat stable mayonnaise-like product; with an oil content of 20% or less and having at least a combination of the following four factors: an opacity, a viscosity, a texture and a taste equivalent to that of a normal mayonnaise.

The invention concerns a mayonnaise-like product, comprising less than 20% edible oil, vinegar, water and further, yoghurt and carrageenan.

According to the invention, it has been found that the whitening efficiency of yoghurt is increased by the synergism with carrageenan. The use of only yoghurt as an ingredient, even at higher concentrations, does not improve the appearance clearly.

DETAILED DESCRIPTION OF THE INVENTION

In the present specification, all percentages are by weight and for yoghurt content, the amount by weight is based upon the wet product.

In the composition of the present invention, the edible oil used can be of any type, for example a vegetable oil such as soy oil.

In the composition of the present invention, the yoghurt is present in an amount of from 5% to 50%. The yoghurt used can be of any type, for example a yoghurt based on full-cream milk or skimmed milk.

Texture is defined as being what is perceived with a spoon or in the mouth in relation to a mayonnaise impression. Texture of fat-free mayonnaise-like products is critical, and an ingredient composition has to be found with optimal texture quality. A targeted design of the texture becomes possible based on the synergism between the carrageenan and the casein micelles of the yoghurt. This synergism results in a slight gelatinization which can be controlled by the concentration of the reactants. This slight gelatinization leads to a short, creamy and non-sticky texture, but cannot be compared with strong gelling substances which lead to a rigid texture and sometimes to a rough structure. Examples for such strong gelling substances are agar or the combination of xanthan with locust bean gum. The viscosity is finally similar to that of a classical mayonnaise.

Heat stability of the composition was also a major aim to enable hot filling of the product, as was renouncing preservatives. Regarding the manufacturing principle, it was the aim to find the most simple solution with the minimum processing effort. Both processing and ingredients costs should be minimal, as is the case with the obtained composition.

In the composition of the present invention, the carrageenan is present in an amount of from 0.03 to 1%. An amount too low would not lead to the above-mentioned synergism, and an amount too high would give a real gelatinization. Most preferably, the carrageenan used is kappa-carrageenan.

All the four above-mentioned factors can be further improved by adding to the composition a starch in the amount of from 2 to 6%. This starch is a hydroxypropyl or acetylated starch. Preferably, the starch used is the hydroxypropyl distarch phosphate or the acetylated distarch adipate, the phosphorylated distarch phosphate or the acetylated distarch phosphate.

If starch is present in the composition, it is normally preferable to add in said composition a non-gelling hydrocolloid like xanthan. The application of such a non-gelling hydrocolloid is effective particularly when the composition is based on acetylated distarch adipate. Best texture properties, however, are achieved when hydroxypropyl distarch phosphate is used in combination with yoghurt, kappa-carrageenan and xanthan. This starch is very stable against retrogradation and contributes to the creamy behaviour of the composition. The composition contains preferably from 0 to 0.4% of xanthan.

A substance also potentially suited as whitening agent is skim milk powder. However, due to its high casein content and the low pH of the mayonnaise-like product, precipitation occurs, resulting in an unacceptable sandy mouthfeel. It has now been found that the precipitation of the proteins in skim milk powder can be prevented by the use of the emulsifier DATEM (diacetyl tartaric esters of mono- and di-glycerides). According to this phenomenon, the application of skim milk powder or casein for improving the appearance of mayonnaise-like product becomes possible and has furthermore the additional advantage of contributing to an improved texture. Skim milk powder or casein is present in the composition in the amount of from 1 to 10%, and DATEM is present in the amount of from 0.3 to 4%.

A mayonnaise-like product according to the invention contains further from 0 to 25% of vegetable pieces. Any type of vegetable can be used, for example onion or cucumber.

The product of the invention comprises also, if necessary, salt and/or sugar, aromas and ingredients which lead to savoury organoleptic character.

With the described composition, the aim of the most simple processing, only including mixing and hot filling, became possible. The heat treatment before hot filling occurs in a classical way, at around 80° C. during from several seconds to 20 minutes. The hot filling is made into the corresponding jars, which are then cooled and which enables reaching a shelf stability of at least 12 months.

According to this procedure, it is also possible to renounce preservatives without any microbiological risk, contributing to a consumer friendly ingredient list for the product. Thus, both the simple processing and the use of standard raw materials, not being specially developed as fat replacers, contribute to very low product costs.

EXAMPLES

Examples are now described by way of illustration only.

Example 1

A screening for the effect of hydrocolloids in a yoghurt fat-free mayonnaise-like product was carried out using the following recipe:

| Ingredient | % |
|---|---|
| water | 59.0 |
| yoghurt | 9.7 |
| maltodextrin | 10.0 |
| sucrose | 6.0 |
| acetylated distarch adipate | 5.5 |
| spirit vinegar (11%) | 5.0 |
| lactose | 3.0 |
| salt | 1.5 |
| hydrocolloid | 0.3 |
| Total | 100.0 |

The mayonnaise-like products were prepared using a batch mixer. All raw materials were degassed, mixed, heated to 85° C. and filled in glass jars. The results can be seen from the following table:

| Hydrocolloid | Sensorial description of the texture | Viscosity at 40 Pa in Pas |
|---|---|---|
| without (reference) | thin | 48 |
| Propylene glycol alginate | long | 142 |
| Compound of xanthan, locust bean gum and guar gum | gelatinized | 10140 |
| xanthan | thick | 290 |
| gellan | thick | 175 |
| Compound of guar gum, xanthan, carrageenan | thick, sticky | 4043 |
| kappa-carrageenan | short, thick, creamy | 81980 |

The viscosity was measured using a Bohlin CS 50 rheometer. The product has the best texture when the viscosity is maximal without showing an off-texture like gelatinized or sticky and long. This is the case for kappa-carrageenan.

Example 2

Fat-free mayonnaise-like products were prepared with the same processing as described in Example 1. The basic recipe for all products can be seen from the following table:

| Ingredients | % |
|---|---|
| salt | 1.5 |
| sucrose | 7.5 |
| maltodextrin | 3.5 |
| lactose | 3.0 |
| spirit vinegar (11%) | 5.2 |
| flavors | 0.6 |
| yoghurt | 17.0 |
| starch (see following table) | 4.0 |
| hydrocolloids (see following table) | 0–0.4 |
| water | add to 100% |

Detailed information on the starch and the hydrocolloids as well as the sensorial product evaluation can be seen from the following table:

| Ingredients | Appearance | Texture |
|---|---|---|
| acetylated distarch adipate (4%) | very glassy, slightly rough | slightly gelatinized |
| hydroxypropyl distarch phosphate (4%) | very glassy, slightly rough | thick |
| acetylated distarch adipate (4%), kappa-carrageenan (0.2%), xanthan (0.2%) | glassy, smooth | creamy |
| hydroxypropyl distarch phosphate (4%), kappa-carrageenan (0.2%), xanthan (0.2%) | glassy, smooth | thick, creamy |

It can be seen that the use of kappa-carrageenan results in a creamy product and reduces the glassy appearance. Best texture and appearance were obtained by the use of kappa-carrageenan and xanthan in combination with hydroxypropyl distarch phosphate.

Example 3

Products with the same basic recipe as in the preceding Example were manufactured with acetylated distarch adipate (4%) and kappa-carrageenan (0.2%). A second product was produced with additionally 0.2% xanthan. With this latter product, absolutely no side product detachment in the glass jars was observed.

Example 4

Products with the same basic recipe as in Example 2 were manufactured using hydroxypropyl distarch phosphate (4%), xanthan (0.2%) and kappa-carrageenan (0.2%). Further ingredients used and results of the sensorial product evaluation can be seen from the following table.

| Ingredients | Appearance | Texture |
|---|---|---|
| Skim milk powder (3.5%) | white, not glassy | sandy, very thick, creamy |
| Skim milk powder (3.5%), DATEM (1.5%) | white, not glassy | not sandy, very thick, creamy |

The results show that skim milk powder leads to a white product and prevents a transparent product appearance. The sandiness arising with skim milk powder can be prevented by the additional use of the emulsifier DATEM. Furthermore, in comparison with the results of Example 2, it can be seen that these ingredients positively also contribute to an improved product texture.

As already stated in Example 1, the filling of the glass jars occur at a temperature of around 80° C. during about 20 min and the obtained mayonnaise-like product retains all its properties of opacity, texture, taste and viscosity during at least 12 months.

It is possible according to the invention to propose to the consumer a substantially fat-free mayonnaise-like product presenting characteristics very near to a normal mayonnaise.

I claim:

1. A food product having a viscosity like mayonnaise which comprises a mixture of an edible oil, a yoghurt, a carrageenan, a starch, water and vinegar components wherein the starch component is selected from the group consisting of a hydroxypropyl starch and an acetylated starch and wherein, by weight, the edible oil component is in an amount less than 20%, the yoghurt component is in an amount of from about 5% to 50%, the carrageenan component is in an amount of from 0.03% to 1% and the starch component is in an amount of from 2% to 6%.

2. A food product having a viscosity like mayonnaise prepared by a process comprising mixing components comprising, by weight based upon product weight, an edible oil in an amount less than 20%, a yoghurt in an amount of from about 5% to 50%, a carrageenan in an amount of from 0.03% to 1% and a starch selected from the group consisting of a hydroxypropyl starch and an acetylated starch in an amount of from 2% to 6% and comprising water and vinegar to obtain the food product.

3. A food product having a viscosity like mayonnaise prepared by a process comprising mixing components comprising, by weight based upon product weight, yoghurt in an amount of from about 5% to 50%, a carrageenan in an amount of from 0.03% to 1% and a starch selected from the group consisting of a hydroxypropyl starch and an acetylated starch in an amount of from 2% to 6% and comprising water and vinegar, and wherein the components mixed do not comprise an edible oil ingredient, to obtain the food product.

4. A food product according to claim 1 or 2 or 3 wherein the starch is selected from the group consisting of hydroxylpropyl distarch phosphate, acetylated distarch phosphate and acetylated distarch adipate.

5. A food product according to claim or 1 or 2 or 3 wherein the carrageenan is kappa-carrageenan.

6. A food product according to claim 1 or 2 or 3 wherein the components further comprise a non-gelling hydrocolloid.

7. A food product according to claim 6 wherein the non-gelling hydrocolloid is xanthan.

8. A food product according to claim 7 wherein the xanthan is present and in an amount up to 0.4% by weight.

9. A food product according to claim 7 wherein the starch is hydroxypropyl distarch phosphate and the carrageenan is kappa-carrageenan.

10. A food product according to claim 6 wherein the starch is acetylated distarch adipate.

11. A product according to claim 1 or 2 or 3 wherein the components further comprise vegetable pieces present in an amount of up to 25%.

12. A food product according to claim 2 or 3 wherein the components further comprise skim milk powder and a diacetyltartaric ester in amounts, respectively, of from 1% to 10% and from 0.3% to 0.4%.

\* \* \* \* \*